(12) United States Patent
Jiang et al.

(10) Patent No.: US 11,736,656 B1
(45) Date of Patent: Aug. 22, 2023

(54) EFFECT VIDEO DETERMINATION METHOD AND APPARATUS, AND NON-TRANSITORY STORAGE MEDIUM

(71) Applicant: Lemon Inc., Grand Cayman (KY)

(72) Inventors: Long Jiang, Culver City, CA (US); Keting Pan, Beijing (CN); Ryan Northway, Culver City, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/880,100

(22) Filed: Aug. 3, 2022

(30) Foreign Application Priority Data

May 17, 2022 (CN) .......................... 202210540730.5

(51) Int. Cl.
*H04N 5/262* (2006.01)
*G10L 21/003* (2013.01)
*H04N 5/272* (2006.01)
*G10L 25/57* (2013.01)
*H04N 23/63* (2023.01)

(52) U.S. Cl.
CPC ......... *H04N 5/2621* (2013.01); *G10L 21/003* (2013.01); *G10L 25/57* (2013.01); *H04N 5/272* (2013.01); *H04N 23/632* (2023.01)

(58) Field of Classification Search
CPC ...... H04N 5/262; H04N 5/2621; H04N 5/272; H04N 5/232935; H04N 23/632; G10L 25/57
See application file for complete search history.

(56) References Cited

U.S. PATENT DOCUMENTS

| 2010/0321534 | A1* | 12/2010 | Kim | G06T 11/00 |
| | | | | 348/E5.022 |
| 2013/0307875 | A1* | 11/2013 | Anderson | A63F 13/213 |
| | | | | 345/633 |
| 2021/0227177 | A1* | 7/2021 | Shah | H04N 7/155 |
| 2022/0108727 | A1* | 4/2022 | van Welzen | G06T 11/60 |
| 2022/0398869 | A1* | 12/2022 | Wright | H04N 5/272 |

* cited by examiner

Primary Examiner — Kelly L Jerabek
(74) Attorney, Agent, or Firm — Faegre Drinker Biddle & Reath LLP

(57) ABSTRACT

Provided are an effect video determination method and apparatus, an electronic device and a storage medium. The method includes: acquiring effect operation information in a process of shooting a video, where the effect operation information includes at least one of a speech effect operation, a touch effect operation or a gesture effect operation; retrieving a target to-be-added effect corresponding to the effect operation information from an effect repository; fusing the target to-be-added effect and a to-be-processed video frame to determine a target effect video frame; and determining a target effect video based on a plurality of target effect video frames.

18 Claims, 7 Drawing Sheets

US 11,736,656 B1

EFFECT VIDEO DETERMINATION METHOD AND APPARATUS, AND NON-TRANSITORY STORAGE MEDIUM

CROSS-REFERENCE TO RELATED APPLICATION(S)

This application claims priority to Chinese Patent Application No. 202210540730.5 filed May 17, 2022, the disclosure of which is incorporated herein by reference in its entirety.

TECHNICAL FIELD

Embodiments of the present disclosure relate to the effect adding technology and, in particular, to an effect video determination method and apparatus, and a non-transitory storage medium.

BACKGROUND

At present, short videos and live streaming are both common content propagation manners in the Internet. In the process of shooting short videos and live streaming, effects may be added to enhance the visual effects.

However, the related manner of adding effects are relatively fixed, and effects cannot be added according to personalized requirements of a user, leading to poor interaction between the user and the video and poor interest of video shooting, and impact of the visual effects of videos and the user experience.

SUMMARY

The present disclosure provides an effect video determination method and apparatus, and a non-transitory storage medium, to improve the interaction flexibility of adding an effect to a video, and enhance the interest of video shooting.

An embodiment of the present disclosure provides an effect video determination method. The method includes steps described below.

Effect operation information is acquired in a process of shooting a video, where the effect operation information includes at least one of a speech effect operation, a touch effect operation or a gesture effect operation.

A target to-be-added effect corresponding to the effect operation information is retrieved from an effect repository.

The target to-be-added effect and a to-be-processed video frame are fused to determine a target effect video frame.

A target effect video is determined based on a plurality of target effect video frames.

An embodiment of the present disclosure further provides an effect video determination apparatus. The apparatus includes at least one processor, and a storage apparatus configured to store at least one program; wherein the at least one program, when executed by the at least one processor, cause the at least one processor to implement: acquiring effect operation information in a process of shooting a video, where the effect operation information comprises at least one of a speech effect operation, a touch effect operation or a gesture effect operation; retrieving a target to-be-added effect corresponding to the effect operation information from an effect repository; fusing the target to-be-added effect and a to-be-processed video frame to determine a target effect video frame; and determining a target effect video based on a plurality of target effect video frames.

An embodiment of the present disclosure provides a storage medium including computer-executable instructions. The computer-executable instructions, when executed by a computer processor, are configured to execute: acquiring effect operation information in a process of shooting a video, wherein the effect operation information comprises at least one of a speech effect operation, a touch effect operation or a gesture effect operation; retrieving a target to-be-added effect corresponding to the effect operation information from an effect repository; fusing the target to-be-added effect and a to-be-processed video frame to determine a target effect video frame; and determining a target effect video based on a plurality of target effect video frames.

According to the technical scheme of the embodiments of the present disclosure, the effect operation information is acquired in the process of shooting a video; the target to-be-added effect corresponding to the effect operation information is determined, so that the effect that a user wants to add is recognized; the target to-be-added effect and the to-be-processed video frame are fused to determine the target effect video frame; and the target effect video is determined based on the plurality of target effect video frames, so that the effect is superimposed on the shot video. In this manner, the issue of poor flexibility and poor interest of adding the effect to the video is solved, the interaction flexibility of adding the effect to the video is improved, and the interest of video shooting is enhanced.

BRIEF DESCRIPTION OF DRAWINGS

The above and other features, advantages, and aspects of embodiments of the present disclosure will become more apparent with reference to the specific implementations hereinafter in conjunction with drawings. Same or similar reference numerals in the drawings denote same or similar elements. It is to be understood that the drawings are illustrative and that originals and elements are not necessarily drawn to scale.

DETAILED DESCRIPTION

Figure 1:
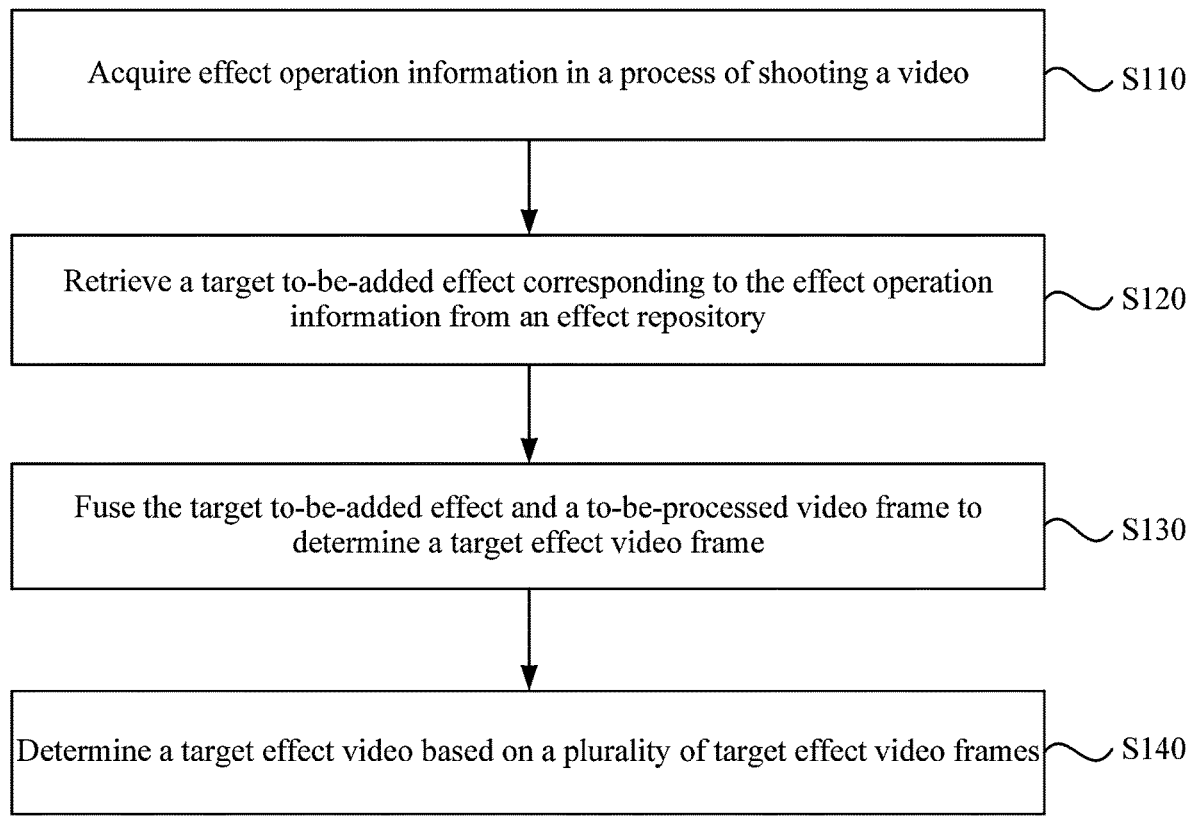
FIG. 1 is a flowchart of an effect video determination method according to an embodiment of the present disclosure.

Embodiments of the present disclosure are described in more detail hereinafter with reference to the drawings. Although some embodiments of the present disclosure are shown in the drawings, it is to be understood that the present disclosure may be implemented in various forms and should not be construed as limited to the embodiments set forth herein; conversely, these embodiments are provided so that the present disclosure will be thoroughly and completely understood. It should be understood that the drawings and the embodiments of the present disclosure are merely illustrative and are not intended to limit the scope of the present disclosure.

It is to be understood that various steps recited in the method embodiments of the present disclosure may be performed in a different order, and/or in parallel. In addition, the method embodiments may include additional steps and/or omit execution of illustrated steps. The scope of the present disclosure is not limited in this respect.

As used herein, the term "comprise" and variations thereof are intended to be inclusive, that is, "including, but not limited to". The term "based on" is "at least partially based on". The term "an embodiment" refers to "at least one embodiment"; the term "another embodiment" refers to "at least another embodiment"; the term "some embodiments" refers to "at least some embodiments". Related definitions of other terms are given in the description hereinafter.

It is to be noted that references to "first", "second" and the like in the present disclosure are merely intended to distinguish one from another apparatus, module, or unit and are not intended to limit the order or interrelationship of the functions performed by the apparatus, module, or unit.

It is to be noted that references to modifications of "one" or "a plurality" in the present disclosure are intended to be illustrative and not limiting, and that those skilled in the art should understand that "one" or "a plurality" should be understood as "one or more" unless clearly expressed in the context.

The names of messages or information exchanged between multiple apparatuses in the embodiments of the present disclosure are only for illustrative purposes and are not intended to limit the scope of such messages or information.

It is to be understood that before using technical schemes disclosed in various embodiments of the present disclosure, a user should be notified of the type, scope of use, use scene and the like of personal information involved in the present disclosure and authorization from the user should be acquired in an appropriate manner according to relevant laws and regulations.

For example, in response to receiving an active request from a user, prompt information is sent to the user to explicitly prompt the user that the requested operations will require obtaining and using the personal information of the user. Accordingly, the user can autonomously select according to the prompt information whether to provide personal information to software or hardware, such as an electronic device, an application program, a server or a storage medium, for executing the operations of the technical schemes of the present disclosure.

In an alternative but non-limiting implementation, in response to receiving the active request from the user, the manner in which the prompt information is sent to the user may be, for example, in the form of a pop-up window in which the prompt information may be presented in text. In addition, the pop-up window may also carry a selection control for the user to select "agree" or "disagree" to providing personal information to the electronic device.

It is to be understood that the preceding process of notifying the user and acquiring the authorization from the user are merely illustrative and do not limit implementations of the present disclosure, and that other manners satisfying relevant laws and regulations may also be applied to the implementations of the present disclosure.

It is to be understood that data (including, but not limited to, the data itself, the acquisition or use of the data) involved in the technical schemes should comply with the requirements of corresponding laws and regulations and relevant provisions.

Before the technical schemes are introduced, application scenes may be described exemplarily. The technical schemes of the present disclosure may be applied to any scenes requiring effect video shooting, interaction with video contents and effect processing in a process of shooting an image. For example, the technical schemes may be applied to a scene in which the shot contents may be shown with effects in a process of shooting a video, such as a short video shooting scene.

Video shooting may be performed in a dynamic shooting scene, and the image shooting may be performed in a static shooting scene, that is, whether in the dynamic shooting scene or the static shooting scene, the technical schemes provided in the embodiments of the present disclosure can be used as long as certain effects are desired to be added to image contents. It may be understood as that the technical schemes may be integrated on any related shooting device. For example, the method may be integrated in a mobile camera in a mobile terminal, or may be integrated in a related special-purpose camera, and of course, to further improve the convenience, may be integrated in a related personal computer (PC) terminal. FIG. 1 is a flowchart of an effect video determination method according to an embodiment of the present disclosure. The embodiment of the present disclosure is applicable to a case where certain interaction with video contents may be performed in the process of shooting a video, and also applicable to a case where interaction with video contents is performed during shooting by video shooting software such as various types of live-streaming software and video chat software. The method may be executed by an effect video determination apparatus, which may be implemented in the form of software and/or hardware, optionally by an electronic device such as a mobile terminal, a PC terminal or a server.

As shown in FIG. 1, the method includes steps described below.

In S110, effect operation information is acquired in a process of shooting a video.

The apparatus for executing the effect video determination method provided in the embodiment of the present disclosure may be integrated in application software supporting effect image processing functions, and the software may be installed in an electronic device, which, optionally, may be a mobile terminal or a PC terminal, etc. The application software may be a type of software for processing image/video, and the specific application software is not described in detail herein, as long as the image/video processing can be implemented. Alternatively, the application software may be a specially-developed application for implementation of adding effects and showing effects, or may be integrated into a corresponding page, and a user can achieve effect adding processing through the integrated page in the PC terminal.

Performing video shooting through a camera in a smart device, or performing video shooting using a video chat function or a video recording function in any software, or performing live streaming using any live-streaming software may all be understood as the process of shooting a video. The effect operation information may be operation information related to the effect to be added subsequently.

The effect operation information includes at least one of a speech effect operation, a touch effect operation or a gesture effect operation.

The speech effect operation may be an effect triggering operation performed by a user through speech. The touch effect operation may be an effect triggering operation performed by a user through a point touch on a screen. The gesture effect operation may be an effect triggering operation performed by a user by showing a specific gesture in a shot picture during shooting.

In an embodiment, in the process of shooting a video, the effect operation information of a user is captured. For example, the speech effect operation, such as "start shooting", is detected; or the touch effect operation, such as clicking on a specific position of the screen, is detected; or the gesture effect operation, such as an OK gesture, is detected.

It is to be noted that various pieces of effect operation information may be simultaneously detected. For example, speech information, a touch operation or gesture information may be acquired.

That is, which one or more effect operations to which the current operation information corresponds may be intelligently determined. Of course, to further improve the efficiency and accuracy of the interaction, at least one interaction mode may be combined to obtain multiple triggering operation modes, so that the effect operation information is determined based on the selection of the triggering operation modes.

In an embodiment, at least one to-be-selected effect operation mode is displayed on a display interface, and a triggered to-be-selected effect operation mode is used as a target effect operation mode to acquire corresponding effect operation information based on the target effect operation mode.

The to-be-selected effect operation mode may be a mode corresponding to at least one piece of effect operation information, such as a speech effect operation mode, a touch effect operation mode, a gesture effect operation mode, a speech plus touch effect operation mode and a speech plus gesture effect operation mode, etc. The display interface may be a display interface of a shooting device, such as a shooting interface displayed on a mobile phone, etc. The target effect operation mode may be a to-be-selected effect operation mode triggered by the user, that is, the to-be-selected effect operation mode for subsequent use.

In an embodiment, various to-be-selected effect operation modes may be displayed on the display interface for the user to select. Then, the triggered to-be-selected effect operation mode is used as the target effect operation mode, and when whether an effect adding operation is triggered is subsequently determined, the target effect operation mode is used, and the corresponding effect operation information is acquired based on the target effect operation mode.

It is to be noted that the various to-be-selected effect operation modes may be displayed in the form of view scrolling on the display interface, and the various to-be-selected effect operation modes may also be displayed in the form of selection controls on the display interface, which is not limited in the embodiment.

It is further to be noted that the purpose of determining the target effect mode is to facilitate quick response to effect operation information. In this manner, the target effect mode is responded to avoid interference of effect operation information of other to-be-selected effect operation modes. For example, if the target effect operation mode is the gesture effect operation mode, even if effect operation information corresponding to the speech effect operation mode exists, no processing is performed; if the target operation mode is the speech plus touch effect operation mode, even if only effect operation information corresponding to the speech effect operation mode exists, no processing is performed.

In an embodiment, the triggering of shooting the video may be determined in any one or more of manners described below.

In manner one, it is detected that a video shooting control is triggered.

The video shooting control may be a key for triggering shooting, and may be a physical key or a virtual key, for example, a shooting button in a camera, a live streaming start button or an effect adding button in a live-streaming software, etc. In an embodiment, the video shooting control may be a key corresponding to any of effect props.

In an embodiment, when it is detected that the video shooting control is triggered, it may be considered that video shooting is triggered, that is, it is determined that the video shooting process has been entered.

In manner two, it is detected that a captured picture includes a target object.

The captured picture may be a picture captured by a camera. The target object may be a preset object, and the target object may be a specific object or an object type. For example, the object type may be humans, animals, trees, vehicles, etc.

In an embodiment, if the target object is a specific object, an image of the specific object may be pre-uploaded for the learning of characteristic information of the specific object. If the captured picture includes an object corresponding to the learned characteristic information, it indicates that video shooting is triggered, that is, it is determined that the video shooting process has been entered. If the target object is an object type, it may be that if the captured picture contains any object corresponding to the object type, it is determined that video shooting is triggered, that is, it is determined that the video shooting process has been entered.

In manner three, it is detected that facial information is consistent with preset facial information.

The facial information may be expression information, such as smile, wink, duck face, etc. The preset facial information may be preset facial information for triggering video shooting.

In an embodiment, the facial information in a captured picture is detected. When the facial information is consistent with the preset facial information, it is determined that video shooting is triggered, that is, it is determined that the video shooting process has been entered.

In manner four, it is detected that speech information triggers a video shooting instruction.

The speech information may be the collected speech of a user.

In an embodiment, when the speech of the user is received and information related to the start of shooting is determined from the speech, for example, when the speech information of "start shooting" is detected, it may be determined that video shooting is triggered, that is, it is determined that the video shooting process has been entered.

In manner five, it is detected that a body movement of a target object in a captured picture is relatively consistent with preset body movement information.

The body movement may include movements performed by human body parts such as the head, neck, hand, elbow, arm, trunk, crotch and foot, for example, nodding, waving, jumping, etc. The preset body movement information may be preset body movement information for triggering video shooting.

In an embodiment, the body movement of the target object in the captured picture is detected. When the body movement is consistent with the preset body movement information, for example, the detected body movement is a hand movement such as an OK gesture, it is determined that video shooting is triggered, that is, it is determined that the video shooting process has been entered.

In S120, a target to-be-added effect corresponding to the effect operation information is retrieved from an effect repository.

The target to-be-added effect may be an effect corresponding to the effect operation information, that is, an effect to be subsequently added to a video frame. The effect repository may be a storage space stored locally or stored on a cloud, and the effect repository is used for storing various effects corresponding to various types of effect operation information.

It is to be noted that the effect repository may include various effects added by program developers during the development and various effects uploaded and produced by users. For example, a user uploads a certain effect, and sets effect operation information corresponding to the effect, so as to retrieve the effect through the effect operation information during subsequent use. The effect uploaded by the user may be a photo, and the user may process the photo to obtain a desired effect. For example, the user uploads a photo with a hat, and then the photo may be cut to obtain the region where the hat is located as a hat effect.

In an embodiment, after the effect operation information is acquired, the target to-be-added effect, that is, the effect to be subsequently added to a video frame, corresponding to the effect operation information may be retrieved from the effect repository according to the effect operation information.

In an embodiment, since the effect operation information may include at least one of the speech effect operation, the touch effect operation or the gesture effect operation, the target to-be-added effect may be an effect that matches at least one effect operation of the effect operation information.

In an embodiment, the target to-be-added effect includes a dynamic effect and/or a static effect.

The dynamic effect may be an effect in a dynamic state, for example, a move effect having a certain move direction and a move speed, and an effect having a shape change, a light and shadow change, etc. The static effect may be an effect having a fixed position and a fixed shape, and the relative position of the static effect and the target object may be fixed. The target to-be-added effect may be an effect determined in an association manner for a subsequent effect.

It is to be noted that whether to add a dynamic effect or a static effect may be determined according to the selection of a user, may be determined according to the form of a pre-stored effect, may be determined according to analysis on a shot picture, or may be determined according to operation information of a user.

In an embodiment, when it is detected that the dynamic effect is triggered, an associated effect corresponding to the target to-be-added effect is displayed.

The associated effect may be another effect bound to and different from the target to-be-added effect.

In an embodiment, if the dynamic effect is triggered, the associated effect corresponding to the target to-be-added effect may be determined and displayed.

Exemplarily, when it is detected that the dynamic effect is triggered, it is determined that the target to-be-added effect is heart-shaped bubbles floating, the associated effect corresponding to the target to-be-added effect is heart-shaped bubbles changing from small to big and then breaking, and then the associated effect may be displayed, that is, the dynamic effect of the heart-shaped bubbles is displayed.

In S130, the target to-be-added effect and a to-be-processed video frame are fused to determine a target effect video frame.

The to-be-processed video frame may be each video frame after the effect operation information is acquired. The target effect video frame may be a video frame obtained after an effect is added.

In an embodiment, after the target to-be-added effect is determined, the target to-be-added effect may be superimposed on and fused with the to-be-processed video frame, so as to add the target to-be-added effect to the to-be-processed video frame, and then the processed video frame is used as the target effect video frame.

In an embodiment, the target to-be-added effect and the to-be-processed video frame may be fused in the manner described below to determine the target effect video frame.

A target display position of the target to-be-added effect in the to-be-processed video frame is determined, and the target to-be-added effect is fused to the target display position to obtain the target effect video frame.

The target display position may be a position for adding the target to-be-added effect, may be a position determined based on the effect operation information, or may be a position determined according to the to-be-processed video frame, etc.

Exemplarily, if the effect operation information is "putting a hat on a person", it may be determined that the target display position in the to-be-processed video frame is the head position of the person, and then the target to-be-added effect may be fused to the target display position to obtain the target effect video frame. If it is determined that the target to-be-added effect is a fish, whether the to-be-processed video frame contains information of water may be detected; if the to-be-processed video frame contains the information of water, the target to-be-added effect may be added to the water.

In S140, a target effect video is determined based on a plurality of target effect video frames.

The target effect video may be a video in which a plurality of target effect video frames are continuously played at a speed of over a preset number of frames per second, and the preset number of frames is usually more than 24 frames. The target effect video may be a video obtained after the target effect video is added.

In an embodiment, after a plurality of target effect video frames are determined, the plurality of target effect video frames may be continuously played in sequence to obtain the target effect video.

In an embodiment, the target effect video may be determined based on the plurality of target effect video frames in the manner described blow.

The plurality of target effect video frames are stitched according to generation timestamps of the plurality of target effect video frames to determine the target effect video.

A generation timestamp may be time information when a target effect video frame is generated.

In an embodiment, when each target effect video frame is generated, a generation timestamp is added to the target effect video frame. Then, the plurality of target effect video frames are sequenced and stitched according to the generation timestamps, and the stitched video is used as the target effect video.

According to the technical scheme of the embodiment of the present disclosure, the effect operation information is acquired in the process of shooting a video; the target to-be-added effect corresponding to the effect operation information is retrieved from the effect repository, so that the effect that a user wants to add is recognized; the target to-be-added effect and the to-be-processed video frame are fused to determine the target effect video frame; and the target effect video is determined based on a plurality of target effect video frames, so that the effect is superimposed on the shot video. In this manner, the problem of poor flexibility and poor interest of adding the effect to the video is solved, the interaction flexibility of adding the effect to the video is improved, and the interest of video shooting is enhanced.

Based on the preceding embodiment, the step in which the target to-be-added effect corresponding to the effect operation information is retrieved from the effect repository may include the step described.

The target to-be-added effect is determined from the effect repository based on the effect operation information and a picture content in the to-be-processed video frame.

The picture content may be current display picture information in the to-be-processed video frame, and each to-be-processed video frame corresponds to a picture content.

In an embodiment, the picture content may include object information, current position information, current time information, etc.

In an embodiment, after the effect operation information and the picture content of the to-be-processed video frame are determined and acquired, matching processing may be performed in the effect repository in combination with the effect operation formation and the picture content, and the matched effect is used as the target to-be-added effect.

Figure 2:
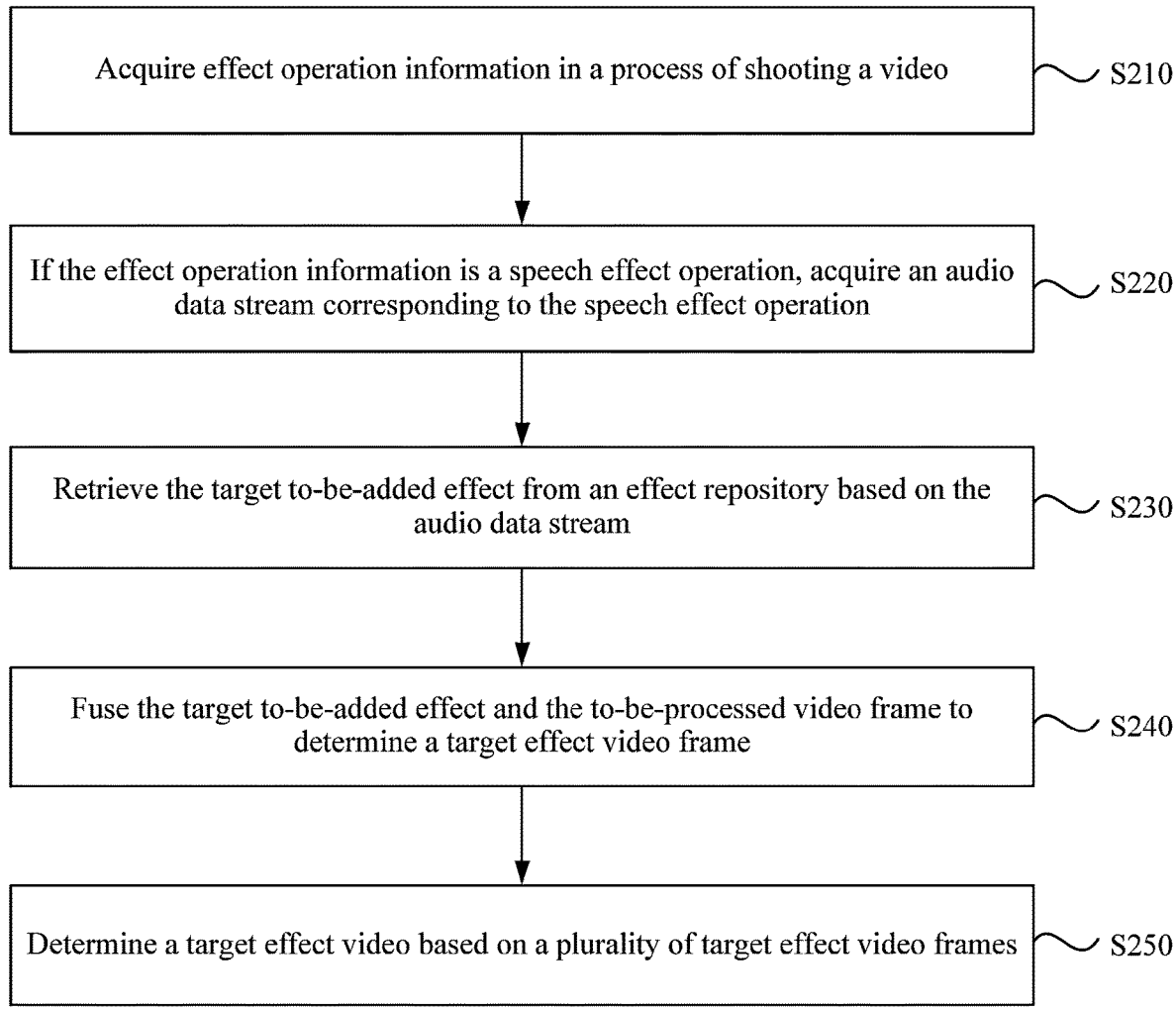
FIG. 2 is a flowchart of an effect video determination method when effect operation information is a speech effect operation according to an embodiment of the present disclosure.

FIG. 2 is a flowchart of an effect video determination method when effect operation information is a speech effect operation according to an embodiment of the present disclosure. Based on the preceding technical schemes, for the case where the effect operation information is the speech effect operation, reference may be made to the detailed description of the technical scheme for the specific manner for determining the target to-be-added effect. Explanations of terms identical to or corresponding to terms in the preceding technical scheme are not repeated here.

As shown in FIG. 2, the method includes steps described below.

In S210, effect operation information is acquired in a process of shooting a video.

In S220, if the effect operation information is a speech effect operation, an audio data stream corresponding to the speech effect operation is acquired.

The audio data stream may be a speech data stream of a user collected in a process of shooting a video.

In an embodiment, after the speech effect operation is determined, the audio data stream corresponding to the speech effect operation may be acquired to subsequently determine a target to-be-added effect.

In S230, the target to-be-added effect is retrieved from an effect repository based on the audio data stream.

In an embodiment, an effect matching the audio data stream may be determined from the effect repository according to the audio data stream as the target to-be-added effect, and the target to-be-added effect is retrieved for subsequent processing.

In an embodiment, the target to-be-added effect may be retrieved in combination with the audio data stream and a picture content in a to-be-processed video frame. In an embodiment, the target to-be-added effect may be retrieved from the effect repository based on the audio data stream and the picture content in the to-be-processed video frame.

In an embodiment, after the audio data stream is obtained, the picture content in the to-be-processed video frame is determined, and matching in the effect repository is performed in combination with the audio data stream and the picture content to match and retrieve the target to-be-added effect.

In an embodiment, if the picture content includes object information and current position information, the target to-be-added effect may be retrieved from the effect repository based on the audio data stream and the picture content in the to-be-processed video frame in the manner described below.

The target to-be-added effect is retrieved from the effect repository according to at least one keyword corresponding to the audio data stream and object information of a target object and the current position information in the picture content.

The object information may be information for describing an object. The object information includes object basic information, such as the hair style, the color of clothes, whether glasses are worn, etc. The current position information includes a scene position where the target object is located and/or a current geographical position of the target object. The scene position where the target object is located may be the position of the target object in a scene picture. The current geographical position may be the geographical position at which video shooting is performed, for example, may be a geographical position determined by a positioning system. For the keyword, the audio data stream may be processed and split into different words having practical meanings, and these words may be taken as keywords.

It is to be noted that the processing on the audio data stream may be conversion processing between speech and text, and processing on words such as word splitting, removal of meaningless words, part of speech analysis, etc., and then the reserved nouns may be used as keywords.

Exemplarily, the text information obtained from the processing on the audio data stream is "adding a hat to a long-hair girl", and then the keywords obtained from the processing may be "long-hair girl" and "hat".

In an embodiment, after various keywords are obtained after the processing on the audio data stream, an effect satisfying various requirements may be retrieved from the effect repository as the target to-be-added effect according to the various keywords, the objection information of the target object and the current position information in the picture content.

Exemplarily, if the keyword is "hat", the object information of the target object is long hair, and the current position information is a certain minority area, then a hat effect suitable for long hair and having the style of the minority may be retrieved from the effect repository.

In an embodiment, the target to-be-added effect may also be retrieved from the effect repository according to at least one keyword corresponding to the audio data stream and object information of a target object and current time information in the picture content.

The current time information may be date information, for example, may be festival information, etc.

Exemplarily, if the keyword is "hat", the object information of the target object is long hair, the current time information is the first day of the first Chinese lunar month, it can be seen that the festival corresponding to the current time information is the Spring Festival, and then a spring festival hat suitable for long hair may be retrieved from the effect repository. For example, the spring festival hat may be a tiger head hat.

In an embodiment, the target to-be-added effect may be retrieved from the effect repository based on at least one keyword through steps described below.

In step one, if at least one keyword of the audio data stream includes object name information, and the picture content includes at least one target object, a target effect adding object corresponding to the object name information is determined.

The object name information may be a name for representing an object. For example, the object name information may be a name, a nickname, a number, etc. The target effect adding object may be a target object in the picture content corresponding to the object name information, that is, an object to which an effect is subsequently to be added.

In an embodiment, according to a pre-stored corresponding relationship between object names and objects, for example, a corresponding relationship between object names and object face images, a face image corresponding to an object name is searched for in the picture content, and a target object having the face image is used as the target effect adding object.

Exemplarily, object name information A corresponds to face image a, object name information B corresponds to face image b, the picture content includes face image a and face image b, and then the object corresponding to object name information A and the object corresponding to object name information B are target objects. If the keyword includes object name information A, then the target object corresponding to face image a is used as the target effect adding object.

In step two, the target to-be-added effect is retrieved from the effect repository based on the at least one keyword and the target effect adding object.

In an embodiment, an effect satisfying the requirements of both the keyword and the target effect adding object may be determined from the effect repository according to the at least one keyword and the target effect adding object, the determined effect is used as the target to-be-added effect, and the target to-be-added effect is retrieved for subsequently adding.

In S240, the target to-be-added effect and the to-be-processed video frame are fused to determine a target effect video frame.

In S250, a target effect video is determined based on a plurality of target effect video frames.

According to the technical scheme of the embodiment of the present disclosure, the effect operation information is acquired in the process of shooting a video; in the case where the effect operation information is the speech effect operation, the audio data stream corresponding to the speech effect operation is acquired; the target to-be-added effect is retrieved from the effect repository based on the audio data stream, so that the target to-be-added effect is determined through the speech effect operation; the target to-be-added effect and the to-be-processed video frame are fused to determine the target effect video frame; and the target effect video is determined based on a plurality of target effect video frames. In this manner, the problem of poor flexibility and poor interest of adding the effect to the video is solved, the interaction flexibility of adding the effect to the video is improved, and the interest of video shooting is enhanced.

Figure 3:
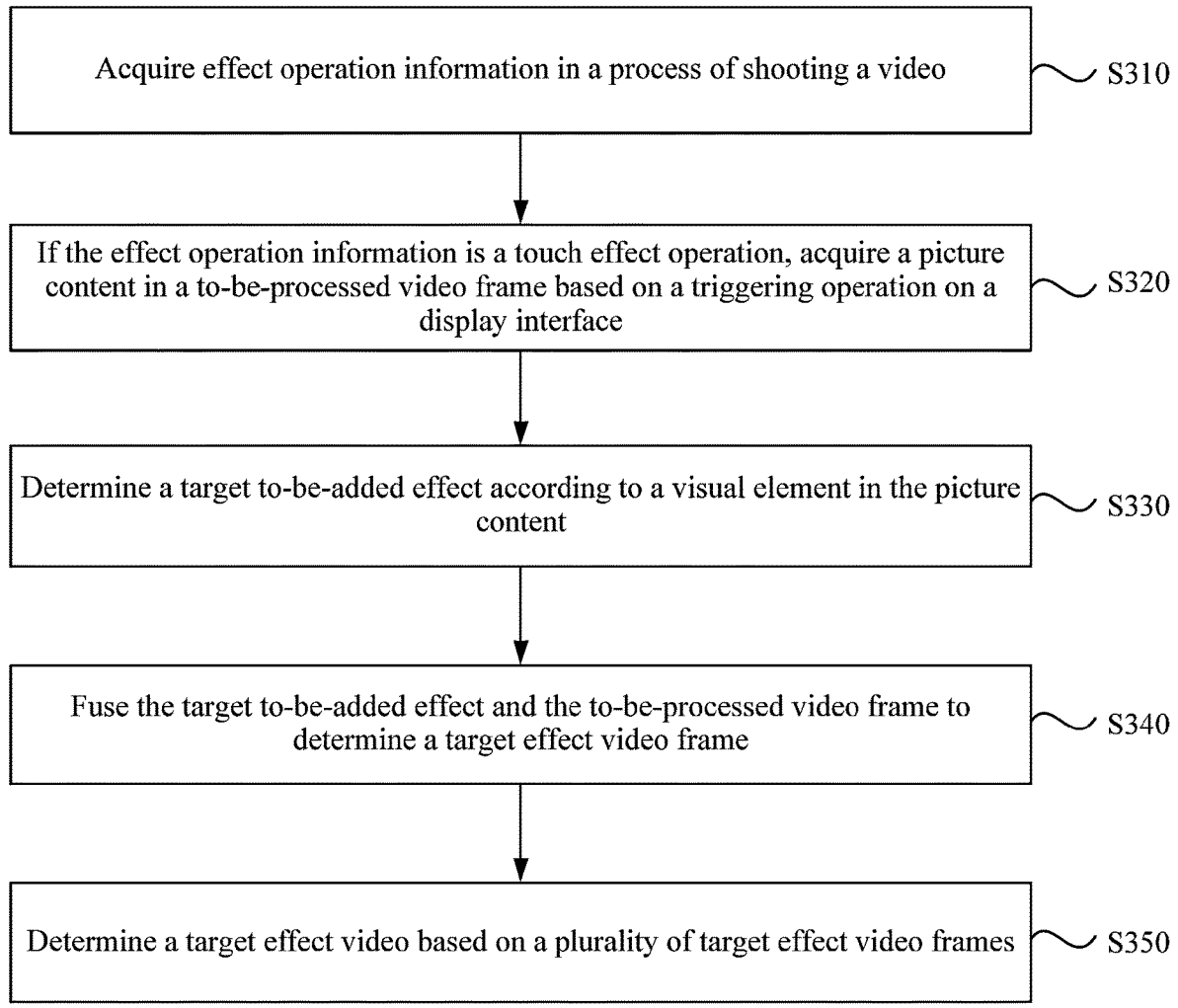
FIG. 3 is a flowchart of an effect video determination method when effect operation information is a touch effect operation according to an embodiment of the present disclosure.

FIG. 3 is a flowchart of an effect video determination method when effect operation information is a touch effect operation according to an embodiment of the present disclosure. Based on the preceding technical schemes, for the case where the effect operation information is the touch effect operation, reference may be made to the detailed description of the technical scheme for the specific manner for determining the target to-be-added effect. Explanations of terms identical to or corresponding to terms in the preceding technical schemes are not repeated here.

As shown in FIG. 3, the method includes steps described below.

In S310, effect operation information is acquired in a process of shooting a video.

In S320, if the effect operation information is a touch effect operation, a picture content in a to-be-processed video frame is acquired based on a triggering operation on a display interface.

The triggering operation corresponds to the touch effect operation. The triggering operation may be a clicking operation and the like on the display interface. The picture content may be various pieces of information in a current to-be-processed video frame, that is, various pieces of information involved in a current shot picture.

In an embodiment, when adding an effect through a touch effect operation, a user may perform a triggering operation on the display interface, and when the triggering operation is detected, the picture content in the to-be-processed video frame may be acquired. The current shot picture may be taken as the picture content, or element segmentation may be performed on the current shot picture to obtain the picture content.

In S330, a target to-be-added effect is determined according to a visual element in the picture content.

The visual element may be various pieces of object information or scene information.

In an embodiment, the visual element may be determined from the picture content, and analysis is performed on the visual element, so that a target to-be-added effect corresponding to an analysis result is determined from an effect repository.

In an embodiment, the target to-be-added effect may be determined according to the visual element in the picture content in the manner described below.

The target to-be-added effect is determined according to the visual element in the picture content and position information corresponding to a touch point.

The touch point may be a point corresponding to a triggering operation, for example, a point the user clicks on the screen. The position information corresponding to the touch point may be position information of the touch point on the display interface.

In an embodiment, the type of the visual element in the picture content corresponding to the position information may be determined according to the position information corresponding to the touch point. Then, the target to-be-added effect may be determined from the effect repository according to the visual element.

Exemplarily, if the visual element corresponding to the position information corresponding to the touch point is the ground, then the found target to-be-added effect may be mushrooms, flowers or small grass sprouting up from the ground. If the visual element corresponding to the position information corresponding to the touch point is a balloon, then the target to-be-added effect found from the effect repository may be an effect of a balloon being punctured.

It is to be noted that when the effect operation information is the touch effect operation, the camera used during video shooting may be a front-facing camera or a rear camera.

In S340, the target to-be-added effect and the to-be-processed video frame are fused to determine a target effect video frame.

In S350, a target effect video is determined based on a plurality of target effect video frames.

According to the technical scheme of the embodiment of the present disclosure, the effect operation information is acquired in the process of shooting a video; in the case where the effect operation information is the touch effect operation, the picture content in the to-be-processed video frame is acquired based on the triggering operation on the display interface; the target to-be-added effect is determined according to the visual element in the picture content, so that the target to-be-added effect is determined through the control effect operation; the target to-be-added effect and the to-be-processed video frame are fused to determine the target effect video frame; and the target effect video is determined based on a plurality of target effect video frames. In this manner, the problem of poor flexibility and poor interest of adding the effect to the video is solved, the interaction flexibility of adding the effect to the video is improved, and the interest of video shooting is enhanced.

Figure 4:
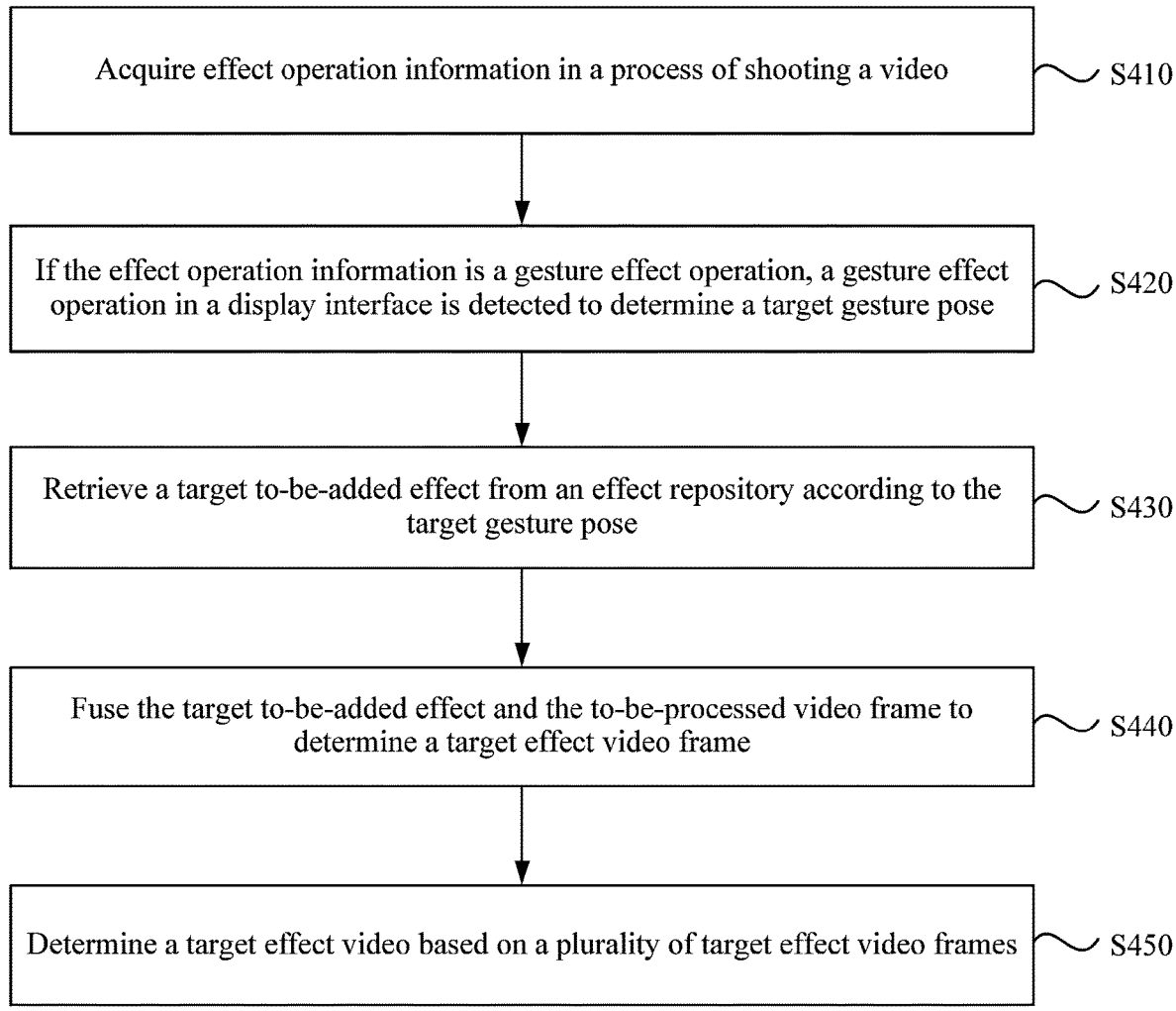
FIG. 4 is a flowchart of an effect video determination method when effect operation information is a gesture effect operation according to an embodiment of the present disclosure.

FIG. 4 is a flowchart of an effect video determination method when effect operation information is a gesture effect operation according to an embodiment of the present disclosure. Based on the preceding technical scheme, in a case where the effect operation information is the gesture effect operation, reference may be made to the detailed description of the technical scheme for the specific manner for determining the target to-be-added effect. Explanations of terms identical to or corresponding to terms in the preceding technical schemes are not repeated here.

As shown in FIG. 4, the method includes steps described below.

In S410, effect operation information is acquired in a process of shooting a video.

In S420, if the effect operation information is a gesture effect operation, a gesture effect operation in a display interface is detected to determine a target gesture pose.

The target gesture pose may be a gesture pose captured in the display interface, and the target gesture pose may be a gesture pose of any target object in the display interface.

In an embodiment, a gesture effect operation in the display interface is detected, and when the gesture effect operation is detected, a target gesture pose corresponding to the gesture effect operation is determined.

Exemplarily, the target gesture pose may be a static gesture, such as a peace gesture, a finger heart, etc., and may also be a dynamic gesture, such as finger pinching, palm grasping, hand waving, etc.

In S430, a target to-be-added effect is retrieved from an effect repository according to the target gesture pose.

In an embodiment, an effect corresponding to the target gesture pose may be searched for in the effect repository according to the target gesture pose, the searched effect is used as the target to-be-added effect, and the target to-be-added effect is retrieved for subsequent effect adding.

In an embodiment, the target to-be-added effect may be retrieved from the effect repository according to the target gesture pose in the manner described below.

The target to-be-added effect is retrieved from the effect repository according to the target gesture pose, position information of the target gesture pose, at least one display object corresponding to a picture content in a to-be-processed video frame and scene information of a scene to which the at least one display object belongs.

The position information of the target gesture pose may be position information of the target gesture pose in the to-be-processed video frame. The display object may be a target object. The scene information may be information for describing a scene, for example, a festive scene in the display interface, a scene with a wide perspective, etc.

In an embodiment, an effect satisfying various requirements may be retrieved from the effect repository as the target to-be-added effect according to the target gesture pose, the position information of the target gesture pose, at least one display object corresponding to the picture content in the to-be-processed video frame and the scene information of the scene to which the at least one display object belongs.

It is to be noted that a corresponding relationship between various gesture poses and to-be-added effects may be pre-stored, so that the target to-be-added effect can be subsequently determined according to the target gesture pose.

Exemplarily, if the target gesture pose is finger spreading, the position information of the target gesture pose corresponds to display object A in the display interface, and the information of the scene to which display object A belongs is a relatively broad scene, then an effect of large wings and an effect of small wings can be determined from the effect repository according to the target gesture pose, and the effect of large wings can be determined according to the scene information. Then, a target effect adding object is determined according to the position information of the target gesture pose and at least one display object in the display interface, and the large wings added to the target effect adding object are taken as the target to-be-added effect.

Exemplarily, the at least one display object in the display interface is a pedestrian shot by a camera, the target gesture pose is a hand stretching into the picture and giving a finger heart, the position information of the target gesture pose is on the pedestrian, and the scene information is a normal scene; then an effect of red hearts coming out can be retrieved from the effect repository to display the effect of red hearts coming out from the pedestrian. Exemplarily, the at least one display object in the display interface is a hand shot by a camera, the target gesture pose is a gesture imitating the Spider Man emitting spider silks, the position information of the target gesture pose is position G in the display picture, that is, the hand position, and the scene information is a block scene; then, a spider silk effect may be retrieved from the effect repository, so that the spider silk effect is emitted from position G.

It is to be noted that when the effect operation information is the gesture effect operation, the camera used during video shooting may be a front-facing camera or a rear camera.

In S440, the target to-be-added effect and the to-be-processed video frame are fused to determine a target effect video frame.

In S450, a target effect video is determined based on a plurality of target effect video frames.

According to the technical scheme of the embodiment of the present disclosure, the effect operation information is acquired in the process of shooting a video; in the case where the effect operation information is the gesture effect operation, the gesture effect operation in the display interface is detected to determine the target gesture pose; the target to-be-added effect is retrieved from the effect repository according to the target gesture pose, so that the target to-be-added effect is determined through the gesture effect operation; the target to-be-added effect and the to-be-processed video frame are fused to determine the target effect video frame; and the target effect video is determined based on a plurality of target effect video frames. In this manner, the problem of poor flexibility and poor interest of adding the effect to the video is solved, the interaction flexibility of adding the effect to the video is improved, and the interest of video shooting is enhanced.

Figure 5:
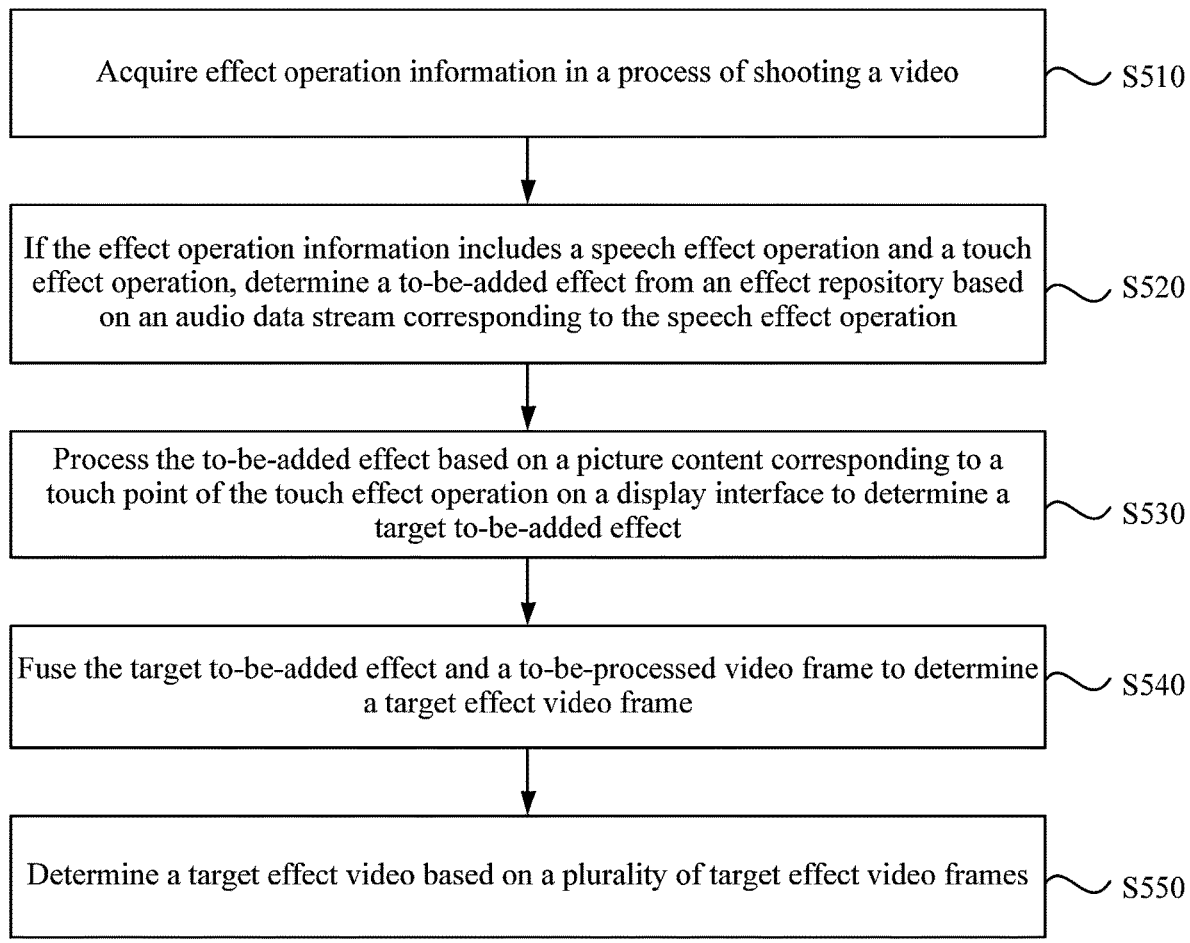
FIG. 5 is a flowchart of an effect video determination method when effect operation information includes a speech effect operation and a touch effect operation according to an embodiment of the present disclosure.

FIG. 5 is a flowchart of an effect video determination method when effect operation information includes a speech effect operation and a touch effect operation according to an embodiment of the present disclosure. Based on the preceding technical schemes, in a case where the effect operation information includes the speech effect operation and the touch effect operation, reference may be made to the detailed description of the technical scheme for the specific manner for determining the target to-be-added effect. Explanations of terms identical to or corresponding to terms in the preceding technical schemes are not repeated here.

As shown in FIG. 5, the method includes steps described below.

In S510, effect operation information is acquired in a process of shooting a video.

In S520, if the effect operation information includes a speech effect operation and a touch effect operation, a to-be-added effect is determined from an effect repository based on an audio data stream corresponding to the speech effect operation.

The to-be-added effect may be an effect determined from the effect repository and corresponding to the audio data stream.

In an embodiment, if the effect operation information includes the speech effect operation and the touch effect operation, the audio data stream of the speech effect operation is acquired and processed, and the to-be-added effect is determined according to a processing result.

It is to be noted that the processing on the audio data stream may be conversion processing between speech and text, and processing on words such as word splitting, removal of meaningless words, part of speech analysis, etc.

In S530, the to-be-added effect is processed based on a picture content corresponding to a touch point of the touch effect operation on a display interface to determine a target to-be-added effect.

The picture content includes at least one visual element. The visual element includes at least one of a target object element, an environment element or an item element.

In an embodiment, the picture content corresponding to the touch point is determined according to the touch point of the touch effect operation on the display interface; the visual element in the picture content is determined, and the to-be-added effect is processed according to the visual element, so that the processed effect conforms to the current visual element; and then the processed to-be-added effect is used as the target to-be-added effect.

Exemplarily, if the visual elements included in the picture content are sky and grassland, and the audio data stream corresponding to the speech effect operation is "putting some birds here", it can be determined that the to-be-added effect is birds. If the visual element corresponding to the touch point in the picture content is sky, then the effect of birds is processed. The birds may be processed as a flock of flying birds, that is, the flock of flying birds are the target to-be-added effect. If the visual element corresponding to the touch point in the picture content is sky, then the effect of birds is processed. The birds may be processed as standing and jumping birds, that is, the standing and jumping birds are the target to-be-added effect.

It is to be noted that in the case where the effect operation information includes the speech effect operation and the touch effect operation, generally, a user describes the content related to the effect through the speech effect operation, and then information such as the position and size of the effect to be added is determined in combination with the touch effect operation, so that the effect required by the user is added more precisely and accurately.

In S540, the target to-be-added effect and a to-be-processed video frame are fused to determine a target effect video frame.

In S550, a target effect video is determined based on a plurality of target effect video frames.

According to the technical scheme of the embodiment of the present disclosure, the effect operation information is acquired in the process of shooting a video; in the case where the effect operation information includes the speech effect operation and the touch effect operation, the to-be-added effect is determined from the effect repository based on the audio data stream corresponding to the speech effect operation; the to-be-added effect is processed based on the picture content corresponding to the touch point of the touch effect operation on the display interface to determine the target to-be-added effect, so that the target to-be-added effect is determined through the speech effect operation and the control effect operation; the target to-be-added effect and the to-be-processed video frame are fused to determine the target effect video frame; and the target effect video is determined based on a plurality of target effect video frames. In this manner, the problem of poor flexibility and poor interest of adding the effect to the video is solved, the interaction flexibility of adding the effect to the video is improved, and the interest of video shooting is enhanced.

Figure 6:
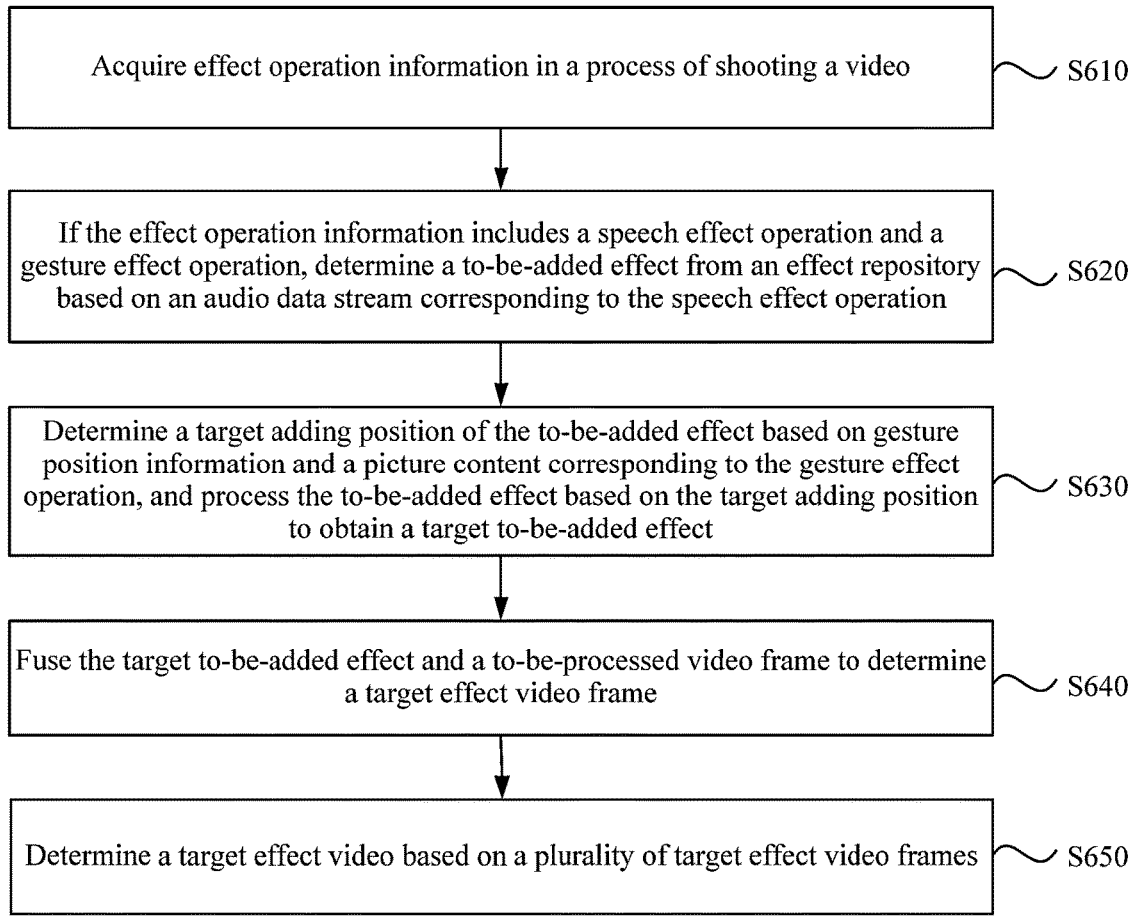
FIG. 6 is a flowchart of an effect video determination method when effect operation information includes a speech effect operation and a gesture effect operation according to an embodiment of the present disclosure.

FIG. 6 is a flowchart of an effect video determination method when effect operation information includes a speech effect operation and a gesture effect operation according to an embodiment of the present disclosure. Based on the preceding technical schemes, in a case where the effect operation information includes the speech effect operation and the gesture effect operation, reference may be made to the detailed description of the technical scheme for the specific manner for determining the target to-be-added effect. Explanations of terms identical to or corresponding to terms in the preceding technical schemes are not repeated here.

As shown in FIG. 6, the method includes steps described below.

In S610, effect operation information is acquired in a process of shooting a video.

In S620, if the effect operation information includes a speech effect operation and a gesture effect operation, a to-be-added effect is determined from an effect repository based on an audio data stream corresponding to the speech effect operation.

In an embodiment, if the effect operation information includes the speech effect operation and the gesture effect operation, the audio data stream of the speech effect operation is acquired and processed, and the to-be-added effect is determined from the effect repository according to a processing result.

In S630, a target adding position of the to-be-added effect is determined based on gesture position information corresponding to the gesture effect operation and a picture content, and the to-be-added effect is processed based on the target adding position to obtain a target to-be-added effect.

The gesture position information may refer to a position indicated by a gesture operation. The target adding position may be a position for adding an effect.

In an embodiment, the gesture position information corresponding to the gesture effect operation may be determined according to the gesture effect operation, and a position corresponding to the gesture position information in the picture content is used as the target adding position. Then, the to-be-added effect may be processed according to the surrounding scene information of the target adding position to obtain the target to-be-added effect.

Exemplarily, the display interface shows a block, the audio data stream corresponding to the speech effect operation is "putting a car here", and it can be determined that the to-be-added effect is a car. If the gesture position information corresponding to the gesture effect operation and the picture content is an open ground in the block, then the open ground may be determined as the target adding position, the placing angle of the car and the size of the effect may be adjusted according to the degree of the broadness of the open ground, and the adjusted to-be-added effect is used as the target to-be-added effect. If the gesture position information corresponding to the gesture effect operation and the picture content is a wall in the block, then the wall may be determined as the target adding position, further, according to the size of the wall, the car may be adjusted as a graffiti-type hand-painted car and the placing angle of the car and the size of the effect are adjusted, and the adjusted to-be-added effect is used as the target to-be-added effect.

It is to be noted that in the case where the effect operation information includes the speech effect operation and the gesture effect operation, generally, a user describes the content related to the effect through the speech effect operation, and then information such as the position and size of the effect to be added is determined in combination with the gesture effect operation, so that the effect required by the user is added more precisely and accurately.

In S640, the target to-be-added effect and a to-be-processed video frame are fused to determine a target effect video frame.

In S650, a target effect video is determined based on a plurality of target effect video frames.

According to the technical scheme of the embodiment of the present disclosure, the effect operation information is acquired in a process of shooting a video; in the case where the effect operation information includes the speech effect operation and the gesture effect operation, the to-be-added effect is determined from the effect repository based on the audio data stream corresponding to the speech effect operation; the target adding position of the to-be-added effect is determined based on the gesture position information corresponding to the gesture effect operation and the picture content, and the to-be-added effect is processed based on the target adding position to obtain the target to-be-added effect, so that the target to-be-added effect is determined through the speech effect operation and the gesture effect operation; the target to-be-added effect and the to-be-processed video frame are fused to determine the target effect video frame; and the target effect video is determined based on a plurality of target effect video frames. In this manner, the problem of poor flexibility and poor interest of adding the effect to the video is solved, the interaction flexibility of adding the effect to the video is improved, and the interest of video shooting is enhanced.

Figure 7:
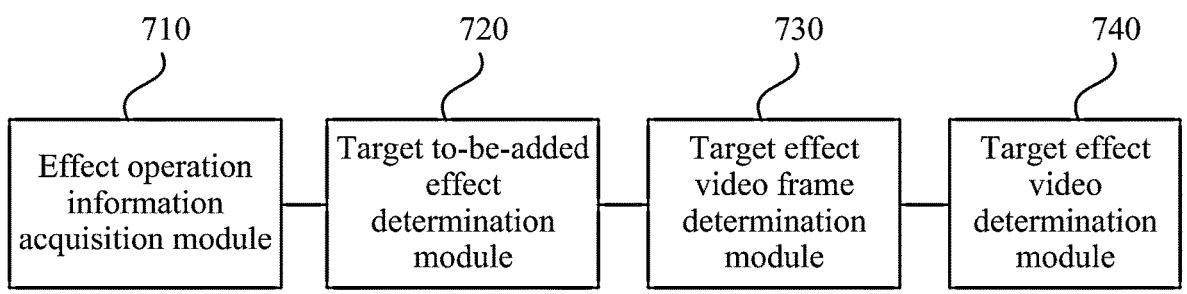
FIG. 7 is a structural diagram of an effect video determination apparatus according to an embodiment of the present disclosure.

FIG. 7 is a structural diagram of an effect video determination apparatus according to an embodiment of the present disclosure. As shown in FIG. 7, the apparatus includes an effect operation information acquisition module 710, a target to-be-added effect determination module 720, a target effect video frame determination module 730 and a target effect video determination module 740.

The effect operation information acquisition module 710 is configured to acquire effect operation information in a process of shooting a video, where the effect operation information includes at least one of a speech effect operation, a touch effect operation or a gesture effect operation. The target to-be-added effect determination module 720 is configured to retrieve a target to-be-added effect corresponding to the effect operation information from an effect repository. The target effect video frame determination module 730 is configured to fuse the target to-be-added effect and a to-be-processed video frame to determine a target effect video frame. The target effect video determination module 740 is configured to determine a target effect video based on a plurality of target effect video frames.

In an embodiment, the apparatus further includes a triggering determination module configured to determine the triggering of shooing the video in at least one of manners described below.

It is detected that a video shooting control is triggered.

It is detected that a captured picture includes a target object.

It is detected that facial information is consistent with preset facial information.

It is detected that speech information triggers a video shooting instruction.

It is detected that a body movement of a target object in a captured picture is relatively consistent with preset body movement information.

In an embodiment, the apparatus further includes a target effect operation mode determination module. The target effect operation mode determination module is configured to display at least one to-be-selected effect operation mode on a display interface, and take a triggered to-be-selected effect operation mode as a target effect operation mode to acquire corresponding effect operation information based on the target effect operation mode.

In an embodiment, when the effect operation information is the speech effect operation, the target to-be-added effect determination module 720 is further configured to acquire an audio data stream corresponding to the speech effect operation; and retrieve the target to-be-added effect from the effect repository based on the audio data stream.

In an embodiment, the target to-be-added effect determination module 720 is further configured to retrieve the target to-be-added effect from the effect repository based on the audio data stream and a picture content in the to-be-processed video frame.

In an embodiment, the target to-be-added effect determination module 720 is further configured to retrieve the target to-be-added effect from the effect repository according to at least one keyword corresponding to the audio data stream and object information of a target object and the current position information in the picture content, where the object information includes object basic information, and the current position information includes a scene position where the target object is located and/or a current geographical position of the target object.

In an embodiment, the target to-be-added effect determination module 720 is further configured to, if at least one keyword of the audio data stream includes object name information, and the picture content includes at least one target object, determine a target effect adding object corresponding to the object name information; and retrieve the target to-be-added effect from the effect repository based on the at least one keyword and the target effect adding object.

In an embodiment, the target to-be-added effect determination module 720 is further configured to determine the target to-be-added effect from the effect repository based on the effect operation information and a picture content in the to-be-processed video frame.

In an embodiment, when the effect operation information is the touch effect operation, the target to-be-added effect determination module 720 is further configured to acquire the picture content in the to-be-processed video frame based on a triggering operation on a display interface, where the triggering operation corresponds to the touch effect operation; and determine the target to-be-added effect according to a visual element in the picture content.

In an embodiment, the target to-be-added effect determination module 720 is further configured to determine the target to-be-added effect according to the visual element in the picture content and position information corresponding to a touch point.

In an embodiment, when the effect operation information is the gesture effect operation, the target to-be-added effect determination module 720 is further configured to detect a gesture effect operation in a display interface to determine a target gesture pose; and retrieve the target to-be-added effect from the effect repository according to the target gesture pose.

In an embodiment, the target to-be-added effect determination module 720 is further configured to retrieve the target to-be-added effect from the effect repository according to the target gesture pose, position information of the target gesture pose, at least one display object corresponding to a picture content in the to-be-processed video frame and scene information of a scene to which the at least one display object belongs.

In an embodiment, when the effect operation information includes the speech effect operation and the touch effect operation, the target to-be-added effect determination module 720 is further configured to determine a to-be-added effect from the effect repository based on an audio data stream corresponding to the speech effect operation; and process the to-be-added effect based on a picture content corresponding to a touch point of the touch effect operation on a display interface to determine the target to-be-added effect; where the picture content includes at least one visual element, where the visual element includes at least one of a target object element, an environment element or an item element.

In an embodiment, when the effect operation information includes the speech effect operation and the gesture effect operation, the target to-be-added effect determination module 720 is further configured to determine a to-be-added effect from the effect repository based on an audio data stream corresponding to the speech effect operation; and determine a target adding position of the to-be-added effect based on gesture position information corresponding to the gesture effect operation and a picture content, and process the to-be-added effect based on the target adding position to obtain the target to-be-added effect.

In an embodiment, the target effect video frame determination module 730 is configured to determine a target display position of the target to-be-added effect in the to-be-processed video frame, and fuse the target to-be-added effect to the target display position to obtain the target effect video frame.

In an embodiment, the target to-be-added effect includes a dynamic effect and/or a static effect.

In an embodiment, the apparatus further includes an associated effect display module. The associated effect display module is configured to, in response to detecting that the dynamic effect is triggered, display an associated effect corresponding to the target to-be-added effect.

According to the technical scheme of the embodiment of the present disclosure, the effect operation information is acquired in a process of shooting a video; the target to-be-added effect corresponding to the effect operation information is retrieved from the effect repository, so that the effect that a user wants to add is recognized; the target to-be-added effect and the to-be-processed video frame are fused to determine the target effect video frame; and the target effect video is determined based on a plurality of target effect video frames, so that the effect is superimposed on the shot video. In this manner, the problem of poor flexibility and poor interest of adding the effect to the video is solved, the interaction flexibility of adding the effect to the video is improved, and the interest of video shooting is enhanced.

The effect video determination apparatus provided in the embodiment of the present disclosure may execute the effect video determination method provided in any embodiment of the present disclosure, and has corresponding functional modules for and beneficial effects of executing the method.

It is to be noted that units and modules included in the preceding apparatus are just divided according to functional logic, and the division is not limited to this, as long as the corresponding functions can be implemented. Additionally, the specific names of the functional units are just intended for distinguishing, and are not to limit the protection scope of the embodiments of the present disclosure.

Figure 8:
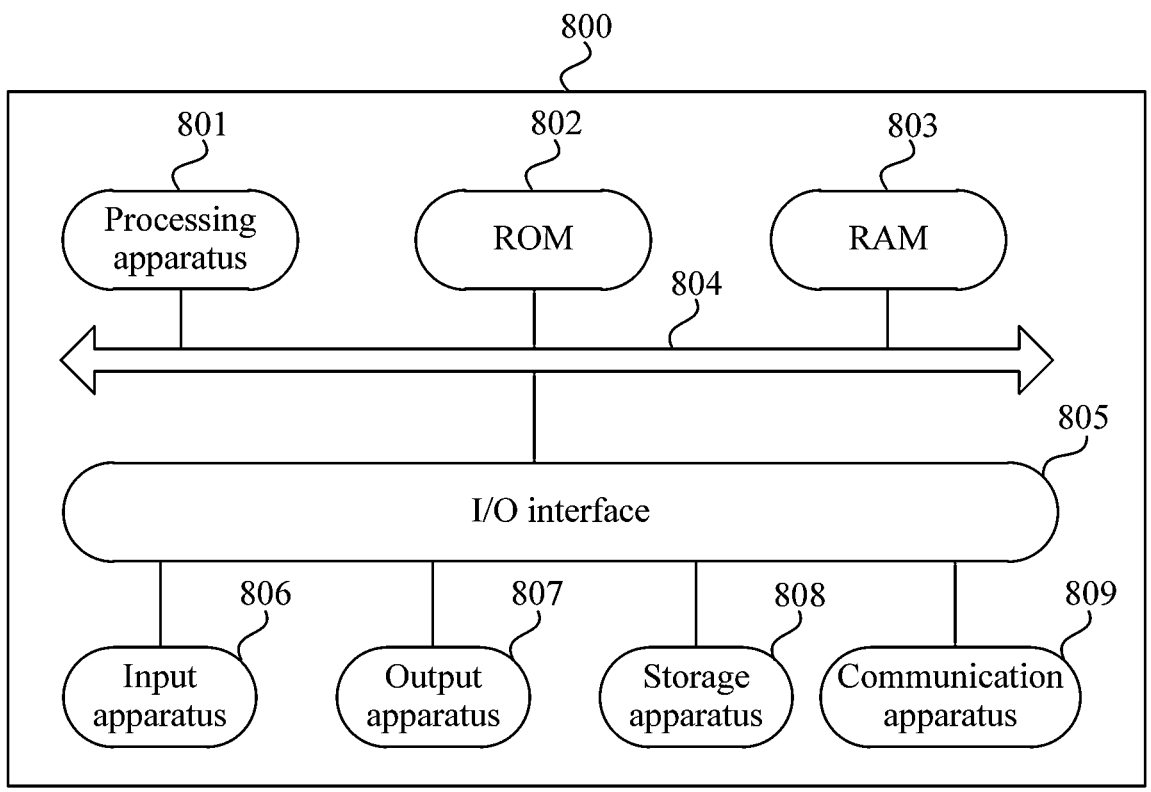
FIG. 8 is a structural diagram of an electronic device according to an embodiment of the present disclosure.

FIG. 8 is a structural diagram of an electronic device according to an embodiment of the present disclosure. Referring to FIG. 8, FIG. 8 shows a structural diagram of an electronic device 800 (such as the terminal device or server in FIG. 8) applicable to implementing the embodiments of the present disclosure. A terminal device in the embodiments of the present disclosure may include, but is not limited to, mobile terminals such as a mobile phone, a laptop, a digital broadcast receiver, a personal digital assistant (PDA), a PAD, a portable media player (PMP), and an in-vehicle terminal (such as an in-vehicle navigation terminal) and stationary terminals such as a digital television (TV) and a desktop computer. The electronic device shown in FIG. 8 is merely an example and is not intended to limit the function and usage scope of the embodiments of the present disclosure.

As shown in FIG. 8, the electronic device 800 may include a processing apparatus 801 (such as a central processing unit and a graphics processing unit). The processing apparatus 801 may execute various types of appropriate operations and processing based on a program stored in a read-only memory (ROM) 802 or a program loaded from a storage apparatus 808 to a random-access memory (RAM) 803. Various programs and data required for the operation of the electronic device 800 are also stored in the RAM 803. The processing apparatus 801, the ROM 802 and the RAM

803 are connected to each other through a bus 804. An input/output (I/O) interface 805 is also connected to the bus 804.

Generally, the following apparatuses may be connected to the I/O interface 805: an input apparatus 806 such as a touch screen, a touch pad, a keyboard, a mouse, a camera, a microphone, an accelerometer, and a gyroscope; an output apparatus 807 such as a liquid crystal display (LCD), a speaker, and a vibrator; the storage apparatus 808 such as a magnetic tape and a hard disk; and a communication apparatus 809. The communication apparatus 809 may allow the electronic device 800 to perform wireless or wired communication with other devices so as to exchange data. Although FIG. 8 illustrates the electronic device 800 having various apparatuses, it is to be understood that not all of the apparatuses illustrated herein need to be implemented or present. Alternatively, more or fewer apparatuses may be implemented or present.

Particularly, according to the embodiments of the present disclosure, the process described above with reference to the flowcharts may be implemented as a computer software program. For example, the embodiments of the present disclosure include a computer program product. The computer program product includes a computer program carried in a non-transitory computer-readable medium. The computer program includes program codes for executing the methods shown in the flowcharts. In such an embodiment, the computer program may be downloaded from a network and installed through the communication apparatus 809, or may be installed from the storage apparatus 808, or may be installed from the ROM 802. When the computer program is executed by the processing apparatus 801, the preceding functions defined in the methods of the embodiments of the present disclosure are executed.

The names of messages or information exchanged between multiple apparatuses in the embodiments of the present disclosure are only for illustrative purposes and are not intended to limit the scope of such messages or information.

The electronic device provided in the embodiment of the present disclosure belongs to the same inventive concept as the effect video determination methods provided in the preceding embodiments, and for the technical details not described in detail in the embodiment, reference may be made to the preceding embodiments, and the embodiment has the same beneficial effects as the preceding embodiments.

An embodiment of the present disclosure provides a computer storage medium storing a computer program which, when executed by a processor, implements the effect video determination method provided in the preceding embodiments.

It is to be noted that the preceding computer-readable medium in the present disclosure may be a computer-readable signal medium or a computer-readable storage medium or any combination thereof. The computer-readable storage medium, for example, may be, but is not limited to, an electronic, magnetic, optical, electromagnetic, infrared or semiconductor system, apparatus or device or any combination thereof. More specific examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any appropriate combination thereof. In the present disclosure, the computer-readable storage medium may be any tangible medium including or storing a program.

The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes, and is not limited to, an electromagnetic signal, an optical signal, or any suitable combination thereof. The computer-readable signal medium may further be any computer-readable medium other than the computer-readable storage medium. The computer-readable signal medium may send, propagate, or transmit a program used by or used in conjunction with an instruction execution system, apparatus, or device. The program codes included on the computer-readable medium may be transmitted via any appropriate medium which includes, but is not limited to, a wire, an optical cable, a radio frequency (RF), or any appropriate combination thereof.

In some embodiments, clients and servers may communicate using any network protocol currently known or to be developed in the future, such as HyperText Transfer Protocol (HTTP), and may be interconnected with any form or medium of digital data communication (such as a communication network). Examples of the communication network include a local area network (LAN), a wide area network (WAN), an internet (such as the Internet), and a peer-to-peer network (such as an Ad-Hoc network), as well as any network currently known or to be developed in the future.

The preceding computer-readable medium may be included in the preceding electronic device or may exist alone without being assembled into the electronic device.

The computer-readable medium carries one or more programs. When the one or more programs are executed by the electronic device, the electronic device is configured to, The preceding computer-readable medium carries one or more programs which, when executed by the electronic device, cause the electronic device to: acquire effect operation information in a process of shooting a video, where the effect operation information includes at least one of a speech effect operation, a touch effect operation or a gesture effect operation; retrieve a target to-be-added effect corresponding to the effect operation information from an effect repository; fuse the target to-be-added effect and a to-be-processed video frame to determine a target effect video frame; and determine a target effect video based on a plurality of target effect video frames.

Computer program codes for executing the operations in the present disclosure may be written in one or more programming languages or combination thereof. The preceding one or more programming languages include, but are not limited to, object-oriented programming languages such as Java, Smalltalk and C++, as well as conventional procedural programming languages such as C or similar programming languages. Program codes may be executed entirely on a user computer, partly on a user computer, as a stand-alone software package, partly on a user computer and partly on a remote computer, or entirely on a remote computer or a server. In the case related to the remote computer, the remote computer may be connected to the user computer via any kind of network including a local area network (LAN) or a wide area network (WAN), or may be connected to an external computer (for example, via the Internet through an Internet service provider).

The flowcharts and block diagrams in the drawings show the possible architecture, function and operation of the system, method and computer program product according to various embodiments of the present disclosure. In this regard, each block in the flowcharts or block diagrams may represent a module, a program segment, or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system which executes specified functions or operations, or a combination of special-purpose hardware and computer instructions.

The units involved in the embodiments of the present disclosure may be implemented by software or hardware. The names of the units do not constitute a limitation on the units themselves. For example, a first acquisition unit may also be described as "a unit for acquiring at least two Internet protocol addresses".

The functions described above herein may be executed, at least partially, by one or more hardware logic components. For example, without limitations, example types of hardware logic components that may be used include: a field-programmable gate array (FPGA), an application-specific integrated circuit (ASIC), an application-specific standard product (ASSP), a system on a chip (SOC), a complex programmable logic device (CPLD) and the like.

In the context of the present disclosure, a machine-readable medium may be a tangible medium that may include or store a program that is used by or used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any suitable combination thereof.

According to one or more embodiments of the present disclosure, example one provides an effect video determination method. The method includes steps described below.

Effect operation information is acquired in a process of shooting a video, where the effect operation information includes at least one of a speech effect operation, a touch effect operation or a gesture effect operation.

A target to-be-added effect corresponding to the effect operation information is retrieved from an effect repository.

The target to-be-added effect and a to-be-processed video frame are fused to determine a target effect video frame.

A target effect video is determined based on a plurality of target effect video frames.

According to one or more embodiments of the present disclosure, example two provides an effect video determination method. The method further includes contents described below.

In an embodiment, the triggering of shooing the video is determined in at least one of manners described below It is detected that a video shooting control is triggered.

It is detected that a captured picture includes a target object.

It is detected that facial information is consistent with preset facial information.

It is detected that speech information triggers a video shooting instruction.

It is detected that a body movement of a target object in a captured picture is relatively consistent with preset body movement information.

According to one or more embodiments of the present disclosure, example three provides an effect video determination method. The method further includes contents described below.

In an embodiment, before the effect operation information is acquired, the step described below is further included.

At least one to-be-selected effect operation mode is displayed on a display interface, and a triggered to-be-selected effect operation mode is used as a target effect operation mode to acquire corresponding effect operation information based on the target effect operation mode.

According to one or more embodiments of the present disclosure, example four provides an effect video determination method. The method further includes contents described below.

In an embodiment, when the effect operation information is the speech effect operation, the step in which the target to-be-added effect corresponding to the effect operation information is retrieved from the effect repository includes steps described below.

An audio data stream corresponding to the speech effect operation is acquired.

The target to-be-added effect is retrieved from the effect repository based on the audio data stream.

According to one or more embodiments of the present disclosure, example five provides an effect video determination method. The method further includes contents described below.

In an embodiment, the step in which the target to-be-added effect is retrieved from the effect repository based on the audio data stream includes the step described below.

The target to-be-added effect is retrieved from the effect repository based on the audio data stream and a picture content in the to-be-processed video frame.

According to one or more embodiments of the present disclosure, example six provides an effect video determination method. The method further includes contents described below.

In an embodiment, the picture content includes object information and current position information, and the step in which the target to-be-added effect is retrieved from the effect repository based on the audio data stream and the picture content in the to-be-processed video frame includes the step described below.

The target to-be-added effect is retrieved from the effect repository according to at least one keyword corresponding to the audio data stream and object information of a target object and the current position information in the picture content.

The object information includes object basic information, and the current position information includes a scene position where the target object is located and/or a current geographical position of the target object.

According to one or more embodiments of the present disclosure, example seven provides an effect video determination method. The method further includes contents described below.

In an embodiment, the picture content includes object information and current position information, and the step in which the target to-be-added effect is retrieved from the effect repository based on the audio data stream and the picture content in the to-be-processed video frame includes steps described below.

In a case where at least one keyword of the audio data stream includes object name information, and the picture content includes at least one target object, a target effect adding object corresponding to the object name information is determined.

The target to-be-added effect is retrieved from the effect repository based on the at least one keyword and the target effect adding object.

According to one or more embodiments of the present disclosure, example eight provides an effect video determination method. The method further includes contents described below.

In an embodiment, the step in which the target to-be-added effect corresponding to the effect operation information is retrieved from the effect repository includes the step described below.

The target to-be-added effect is determined from the effect repository based on the effect operation information and a picture content in the to-be-processed video frame.

According to one or more embodiments of the present disclosure, example nine provides an effect video determination method. The method further includes contents described below.

In an embodiment, when the effect operation information is the touch effect operation, the step in which the target to-be-added effect is determined from the effect repository based on the effect operation information and the picture content in the to-be-processed video frame includes steps described below.

The picture content in the to-be-processed video frame is acquired based on a triggering operation on a display interface, where the triggering operation corresponds to the touch effect operation.

The target to-be-added effect is determined according to a visual element in the picture content.

According to one or more embodiments of the present disclosure, example ten provides an effect video determination method. The method further includes contents described below.

In an embodiment, the step in which the target to-be-added effect is determined according to the visual element in the picture content includes the step described below.

The target to-be-added effect is determined according to the visual element in the picture content and position information corresponding to a touch point.

According to one or more embodiments of the present disclosure, example eleven provides an effect video determination method. The method further includes contents described below.

In an embodiment, when the effect operation information is the gesture effect operation, the step in which the target to-be-added effect corresponding to the effect operation information is retrieved from the effect repository includes steps described below.

A gesture effect operation in a display interface is detected to determine a target gesture pose.

The target to-be-added effect is retrieved from the effect repository according to the target gesture pose.

According to one or more embodiments of the present disclosure, example twelve provides an effect video determination method. The method further includes contents described below.

In an embodiment, the step in which the target to-be-added effect is retrieved from the effect repository according to the target gesture pose includes the step described below.

The target to-be-added effect is retrieved from the effect repository according to the target gesture pose, position information of the target gesture pose, at least one display object corresponding to a picture content in the to-be-processed video frame and scene information of a scene to which the at least one display object belongs.

According to one or more embodiments of the present disclosure, example thirteen provides an effect video determination method. The method further includes contents described below.

In an embodiment, when the effect operation information includes the speech effect operation and the touch effect operation, the step in which the target to-be-added effect corresponding to the effect operation information is retrieved from the effect repository includes steps described below.

A to-be-added effect is determined from the effect repository based on an audio data stream corresponding to the speech effect operation.

The to-be-added effect is processed based on a picture content corresponding to a touch point of the touch effect operation on a display interface to determine the target to-be-added effect.

The picture content includes at least one visual element, where the visual element includes at least one of a target object element, an environment element or an item element.

According to one or more embodiments of the present disclosure, example fourteen provides an effect video determination method. The method further includes contents described below.

In an embodiment, when the effect operation information includes the speech effect operation and the gesture effect operation, the step in which the target to-be-added effect corresponding to the effect operation information is retrieved from the effect repository includes steps described below.

A to-be-added effect is determined from the effect repository based on an audio data stream corresponding to the speech effect operation.

A target adding position of the to-be-added effect is determined based on gesture position information corresponding to the gesture effect operation and a picture content, and the to-be-added effect is processed based on the target adding position to obtain the target to-be-added effect.

According to one or more embodiments of the present disclosure, example fifteen provides an effect video determination method. The method further includes contents described below.

In an embodiment, the step in which the target to-be-added effect and the to-be-processed video frame are fused to determine the target effect video frame includes the step described below.

A target display position of the target to-be-added effect in the to-be-processed video frame is determined, and the target to-be-added effect is fused to the target display position to obtain the target effect video frame.

According to one or more embodiments of the present disclosure, example sixteen provides an effect video determination method. The method further includes the content described below.

In an embodiment, it is further included that the target to-be-added effect includes a dynamic effect and/or a static effect.

According to one or more embodiments of the present disclosure, example seventeen provides an effect video determination method. The method further includes the content described below.

In an embodiment, the step described below is further included.

In response to detecting that the dynamic effect is triggered, an associated effect corresponding to the target to-be-added effect is displayed.

According to one or more embodiments of the present disclosure, example eighteen provides an effect video determination method. The method further includes contents described below.

In an embodiment, the step in which the target effect video is determined based on the plurality of target effect video frames includes the step described below.

The plurality of target effect video frames are stitched according to generation timestamps of the plurality of target effect video frames to determine the target effect video.

According to one or more embodiments of the present disclosure, example nineteen provides an effect video determination apparatus. The apparatus includes an effect operation information acquisition module, a target to-be-added effect determination module, a target effect video frame determination module and a target effect video determination module.

The effect operation information acquisition module is configured to acquire effect operation information in a process of shooting a video, where the effect operation information includes at least one of a speech effect operation, a touch effect operation or a gesture effect operation.

The target to-be-added effect determination module is configured to retrieve a target to-be-added effect corresponding to the effect operation information from an effect repository.

The target effect video frame determination module is configured to fuse the target to-be-added effect and a to-be-processed video frame to determine a target effect video frame.

The target effect video determination module is configured to determine a target effect video based on a plurality of target effect video frames.

The preceding description is merely illustrative of preferred embodiments of the present disclosure and the technical principles used therein. Those of ordinary skill in the art should understand that the scope referred to in the disclosure is not limited to the technical schemes formed by the particular combination of the preceding technical features, but intended to cover other technical schemes which may be formed by any combination of the preceding technical features or their equivalents without departing from the concept of the disclosure, for example, technical schemes formed by mutual substitutions of the preceding features and the technical features disclosed in the present disclosure (but not limited to) that have similar functions.

In addition, although the operations are depicted in a particular order, this should not be construed as requiring that such operations should be performed in the particular order shown or in a sequential order. In certain circumstances, multitasking and parallel processing may be advantageous. Similarly, although specific implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments, individually, or in any suitable sub-combination.

Although the subject matter is described in the language specific to structural features and/or methodological logic acts, it is to be understood that the subject matter defined in the appended claims is not necessarily limited to the specific features or acts described above. Conversely, the specific features and acts described above are merely example forms of implementing the claims.

What is claimed is:

1. An effect video determination method, comprising:
   acquiring effect operation information in a process of shooting a video, wherein the effect operation information comprises at least one of a speech effect operation, a touch effect operation or a gesture effect operation;
   retrieving a target to-be-added effect corresponding to the effect operation information from an effect repository;
   fusing the target to-be-added effect and a to-be-processed video frame to determine a target effect video frame; and
   determining a target effect video based on a plurality of target effect video frames;
   wherein before acquiring the effect operation information, the method further comprising:
   displaying at least one to-be-selected effect operation mode on a display interface, and using a triggered to-be-selected effect operation mode as a target effect operation mode to acquire corresponding effect operation information based on the target effect operation mode such that effect operation information corresponding to an effect operation mode which is not triggered is not processed.

2. The method according to claim 1, wherein determining triggering of shooting the video comprises at least one of the following:
   detecting that a video shooting control is triggered;
   detecting that a captured picture comprises a target object;
   detecting that facial information is consistent with preset facial information;
   detecting that speech information triggers a video shooting instruction; or
   detecting that a body movement of a target object in a captured picture is relatively consistent with preset body movement information.

3. The method according to claim 1, wherein when the effect operation information is the speech effect operation, retrieving the target to-be-added effect corresponding to the effect operation information from the effect repository comprises:
   acquiring an audio data stream corresponding to the speech effect operation; and
   retrieving the target to-be-added effect from the effect repository based on the audio data stream.

4. The method according to claim 3, wherein retrieving the target to-be-added effect from the effect repository based on the audio data stream comprises:
  retrieving the target to-be-added effect from the effect repository based on the audio data stream and a picture content in the to-be-processed video frame.

5. The method according to claim 4, wherein the picture content comprises object information and current position information, and wherein retrieving the target to-be-added effect from the effect repository based on the audio data stream and the picture content in the to-be-processed video frame comprises:
  retrieving the target to-be-added effect from the effect repository according to at least one keyword corresponding to the audio data stream and object information of a target object and current position information of the target object in the picture content, wherein the object information comprises object basic information, and the current position information comprises at least one of a scene position where the target object is located or a current geographical position of the target object.

6. The method according to claim 4, wherein the picture content comprises object information and current position information, and wherein retrieving the target to-be-added effect from the effect repository based on the audio data stream and the picture content in the to-be-processed video frame comprises:
  in a case where at least one keyword of the audio data stream comprises object name information, and the picture content comprises at least one target object, determining a target effect adding object corresponding to the object name information; and
  retrieving the target to-be-added effect from the effect repository based on the at least one keyword and the target effect adding object.

7. The method according to claim 1, wherein retrieving the target to-be-added effect corresponding to the effect operation information from the effect repository comprises:
  determining the target to-be-added effect from the effect repository based on the effect operation information and a picture content in the to-be-processed video frame.

8. The method according to claim 7, wherein when the effect operation information is the touch effect operation, determining the target to-be-added effect from the effect repository based on the effect operation information and the picture content in the to-be-processed video frame comprises:
  acquiring the picture content in the to-be-processed video frame based on a triggering operation on a display interface, wherein the triggering operation corresponds to the touch effect operation; and
  determining the target to-be-added effect according to a visual element in the picture content.

9. The method according to claim 8, wherein determining the target to-be-added effect according to the visual element in the picture content comprises:
  determining the target to-be-added effect according to the visual element in the picture content and position information corresponding to a touch point.

10. The method according to claim 1, wherein when the effect operation information is the gesture effect operation, retrieving the target to-be-added effect corresponding to the effect operation information from the effect repository comprises:

detecting a gesture effect operation in a display interface to determine a target gesture pose; and
  retrieving the target to-be-added effect from the effect repository according to the target gesture pose.

11. The method according to claim 10, wherein retrieving the target to-be-added effect from the effect repository according to the target gesture pose comprises:
  retrieving the target to-be-added effect from the effect repository according to the target gesture pose, position information of the target gesture pose, at least one display object corresponding to a picture content in the to-be-processed video frame and scene information of a scene to which the at least one display object belongs.

12. The method according to claim 1, wherein when the effect operation information comprises the speech effect operation and the touch effect operation, retrieving the target to-be-added effect corresponding to the effect operation information from the effect repository comprises:
  determining a to-be-added effect from the effect repository based on an audio data stream corresponding to the speech effect operation; and
  processing, based on a picture content corresponding to a touch point of the touch effect operation on a display interface, the to-be-added effect to determine the target to-be-added effect;
  wherein the picture content comprises at least one visual element, and the at least one visual element comprises at least one of a target object element, an environment element or an item element.

13. The method according to claim 1, wherein when the effect operation information comprises the speech effect operation and the gesture effect operation, retrieving the target to-be-added effect corresponding to the effect operation information from the effect repository comprises:
  determining a to-be-added effect from the effect repository based on an audio data stream corresponding to the speech effect operation; and
  determining a target adding position of the to-be-added effect based on gesture position information corresponding to the gesture effect operation and a picture content, and processing the to-be-added effect based on the target adding position to obtain the target to-be-added effect.

14. The method according to claim 1, wherein fusing the target to-be-added effect and the to-be-processed video frame to determine the target effect video frame comprises:
  determining a target display position of the target to-be-added effect in the to-be-processed video frame, and fusing the target to-be-added effect to the target display position to obtain the target effect video frame.

15. The method according to claim 1, wherein the target to-be-added effect comprises at least one of a dynamic effect or a static effect.

16. The method according to claim 15, further comprising:
  in response to detecting that the dynamic effect is triggered, displaying an associated effect corresponding to the target to-be-added effect.

17. An effect video determination apparatus, comprising: at least one processor, and a storage apparatus configured to store at least one program; wherein the at least one program, when executed by the at least one processor, cause the at least one processor to implement:
  acquiring effect operation information in a process of shooting a video, wherein the effect operation information comprises at least one of a speech effect operation, a touch effect operation or a gesture effect operation;

retrieving a target to-be-added effect corresponding to the effect operation information from an effect repository;

fusing the target to-be-added effect and a to-be-processed video frame to determine a target effect video frame; and determining a target effect video based on a plurality of target effect video frames;

wherein before acquiring the effect operation information, the at least one program, when executed by the at least one processor, causes the at least one processor to further implement:

displaying at least one to-be-selected effect operation mode on a display interface, and using a triggered to-be-selected effect operation mode as a target effect operation mode to acquire corresponding effect operation information based on the target effect operation mode such that effect operation information corresponding to an effect operation mode which is not triggered is not processed.

18. A non-transitory storage medium comprising computer-executable instructions which, when executed by a computer processor, are configured to execute:

acquiring effect operation information in a process of shooting a video, wherein the effect operation information comprises at least one of a speech effect operation, a touch effect operation or a gesture effect operation;

retrieving a target to-be-added effect corresponding to the effect operation information from an effect repository;

fusing the target to-be-added effect and a to-be-processed video frame to determine a target effect video frame; and determining a target effect video based on a plurality of target effect video frames;

wherein before acquiring the effect operation information, the computer-executable instructions, when executed by a computer processor, are further configured to execute:

displaying at least one to-be-selected effect operation mode on a display interface, and using a triggered to-be-selected effect operation mode as a target effect operation mode to acquire corresponding effect operation information based on the target effect operation mode such that effect operation information corresponding to an effect operation mode which is not triggered is not processed.

\* \* \* \* \*